United States Patent [19]

Panourgias

[11] 4,059,296
[45] Nov. 22, 1977

[54] QUICK-ACTION COUPLING FOR PIPES OR TUBES

[75] Inventor: Constantin George Panourgias, Moschaton, Piraeus, Greece

[73] Assignee: Hellenic Plastics and Rubber Industry, Moschaton, Piraeus, Greece

[21] Appl. No.: 630,895

[22] Filed: Nov. 11, 1975

[30] Foreign Application Priority Data
Nov. 12, 1974 Greece ........................................ 239

[51] Int. Cl.² ............................................ F16L 37/18
[52] U.S. Cl. .................................... 285/312; 285/423
[58] Field of Search ............... 285/312, 320, 311, 310, 285/309, 328, 423

[56] References Cited

U.S. PATENT DOCUMENTS

| | | | |
|---|---|---|---|
| 1,340,785 | 5/1920 | McMullin | 285/312 X |
| 1,581,442 | 4/1926 | Hawkins | 285/320 X |
| 1,786,825 | 12/1930 | Comer | 285/320 X |
| 3,187,773 | 6/1965 | Braunberger | 285/312 X |
| 3,204,991 | 9/1965 | Hauk | 285/312 |
| 3,284,112 | 11/1966 | Martin | 285/328 |
| 3,633,948 | 1/1972 | Dickey | 285/312 |
| 3,827,728 | 8/1974 | Hynes | 285/309 X |
| 3,857,588 | 12/1974 | Curtin | 285/423 X |
| 3,860,274 | 1/1975 | Ledstrom et al. | 285/312 |

FOREIGN PATENT DOCUMENTS 1,600,480  5/1970  Germany ........................... 285/320

Primary Examiner—Thomas F. Callaghan
Attorney, Agent, or Firm—Cushman, Darby & Cushman

[57] ABSTRACT

A quick-action pipe or hose coupling made of a plastics material comprising a male and female member for attachment to respective free ends of first and second pipes to be coupled together, the female member being shaped to receive said male member and having at least two locking members thereon, each locking member having first and second parts for cooperation with said male member to grip and retain it in the female member, said first part being shaped to cooperate with the male member so that said pipes are drawn together when the locking member is moved from a release position to a clamping position and said second part having an abutment surface which abuts against a corresponding abutment surface on the male member when the lever is in its clamping position to prevent axial separation of the pipes. Conveniently each locking member is an overcenter lever which is pivotally attached to the female member, the male member being provided with an annular recess and V-shaped groove with which the correspondingly shaped first and second parts on the overcenter levers cooperate. The coupling can have a pair of diametrically opposed levers as illustrated but more levers can be provided depending on the use of the coupling.

1 Claim, 5 Drawing Figures

QUICK-ACTION COUPLING FOR PIPES OR TUBES

This invention relates to a quick-action coupling made of a plastics material such as PVC or PVC reinforced with glass fiber which can be used to connect two pipes together.

The coupling of the invention is primarily intended for use in connecting pipes or hoses of a system operating under pressure, for instance fire-extinguishing or irrigation networks. A problem with such systems is that they are usually operated at pressures, for instance between 4 and 8 $Kp/cm^2$, which makes it difficult to maintain adequate seals between adjoining pipes if a plastics coupling is used due to the greater deformation of the plastics for a given load than would occur in a similarly constructed metal coupling.

It is therefore an object of the present invention to provide a coupling which overcomes or substantially reduces these disadvantages.

According to the invention there is provided a quick-action coupling for pipes made of a plastics material comprising a male and female member for attachment to respective free ends of first and second pipes to be coupled together, the female member being shaped to receive said male member and having at least two locking members thereon, each locking member having first and second parts for cooperation with said male member to grip and retain it in the female member, said first part being shaped to cooperate with the male member so that said pipes are drawn together when the locking member is moved from a release position to a clamping position and said second part having an abutment surface which abuts against a corresponding abutment surface on the male member when the lever is in its clamping position to prevent axial separation of the pipes.

Conveniently, each locking member is an over-center lever pivotally attached to the female member. However, other forms of locking member could be used, for instance a member mounted for sliding or rotational movement relative to the female member.

A preferred embodiment of a coupling of the invention will now be described, by way of example only, with reference to the accompanying diagrammatic drawings in which.

Figure 1:
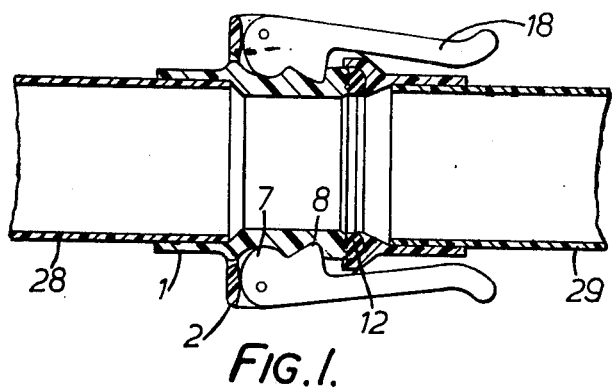
FIG. 1 is a cross-section through a coupling of the invention which includes a male and female member.

Referring to the drawings there is shown a quick action coupling for connecting pipes, tubes or hoses together. The coupling is made of a thermoplastic or thermosetting material such as polypropylene, polyethylene, or any GRP (glass fiber reinforced plastics such as polyvinylchloride). These materials are given by way of example only as it will be appreciated that any suitable rigid plastics material could be used.

The coupling comprises a male sleeve member 1, and a female clamping member 2 both of which are made of a plastics material such as hereinbefore referred to.

The male member 1 is a cylindrical sleeve having a first portion 3 whose internal diameter is substantially the same as the outside diameter of pipe 5 over which the sleeve member 1 is to be fitted. The male member 1 also includes a second portion 4 whose internal diameter is less than that of the first portion 3 to provide an annular step 6 against which the end of the pipe 5 abuts when it is inserted in the sleeve member 1. The outer surface of the second portion 4 is formed with an annular recess 7 and an annular generally V-shaped groove 8, the function of which will be explained hereafter. As can be seen from FIG. 2, the recess 7 is generally arcuate in cross section, whereas the groove 8 is generally V-shaped, one wall thereof providing a planar generally upright and planar abutment surface 9. End 10 of the male member 1 is generally normal to the longitudinal axis of the member 1 and provides a surface which compresses a sealing ring 12 (see FIG. 1) to form a seal in the coupling when the male member 1 is clamped in female member 2. The surface 10 is provided with a series of concentric grooves 11 to improve sealing.

The female member 2 comprises a cylindrical sleeve having a clamping portion 13 and an end portion 14. The internal diameter of the clamping portion 13 is greater than that of the end portion 14 to provide an annular step 15 which is recessed at 16 to receive and locate the sealing ring 12. The inside wall of the end portion 14 tapers inwardly in the vicinity of the annular step 15 to provide an orifice 17 whose diameter is substantially the same as the internal diameter of the second portion 4 of the male member 1.

The clamping portion 13 of the female member 2 comprises a tubular sleeve whose internal diameter is substantially the same as the maximum external diameter of the second portion 4 of the male member 1. Two diametrically opposed locking members in the form of over-centre levers 18 are each pivotally attached to the female member 2 by respective pins 19 supported in respective pairs of upstanding walls 20 on either side of each lever 18. A further wall 21 connecting the pairs of walls 20 privides an end stop to limit rotational movement of each lever. An aperture 22 is provided in the wall of the clamping portion 13 immediately beneath each lever 18 so that first and second shaped parts 23, 24 on each lever 18 can cooperate with the recess 7 and groove 8 in the male member 1 when each lever is moved from its release position shown in FIG. 3 to its clamping position shown in FIG. 1.

Figures 2, 3, 5:
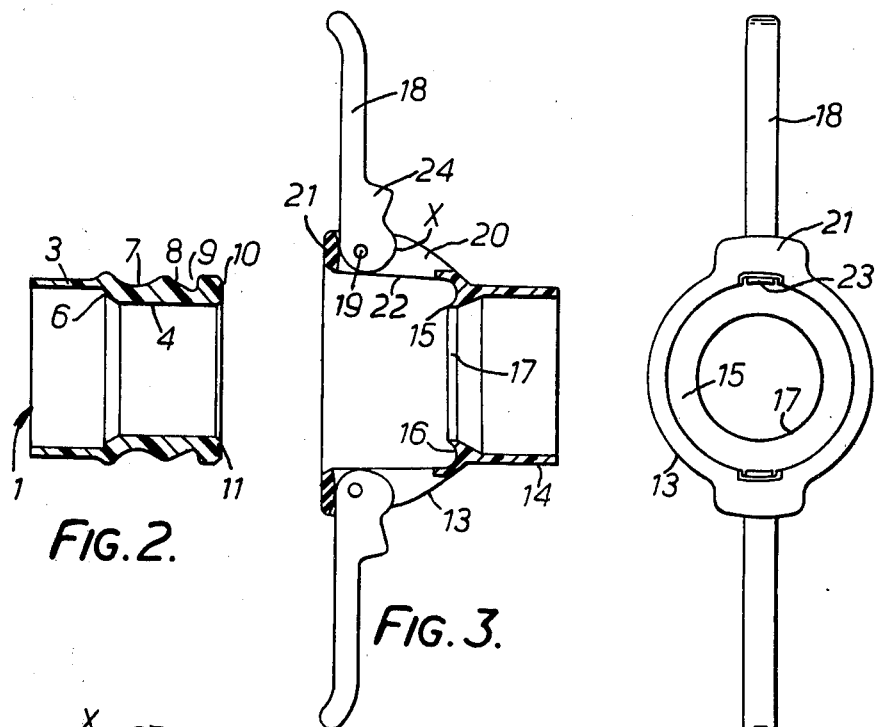
FIG. 2 is a cross-section through the male member of the coupling shown in FIG. 1.
FIG. 3 is a partial cross-section through the female member of the coupling shown in FIG. 1.
FIG. 5 is an end view of the female member, shown in FIG. 3.
Figure 4:
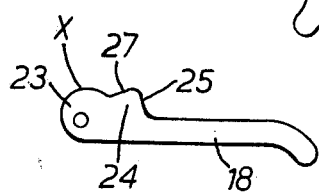
FIG. 4 is a side elevation of part of the female member shown in FIG. 3.

The shape of the surface of each first part 23 which engages with the arcuate recess 7 in the male member 1 is generally arcuate although as can be seen from FIGS. 3 and 4, the lever is pivoted about a point which is eccentrically disposed with respect to the mean centre of the first part 23 so that the lever is what is known in the art as an over-centre lever. Thus, it is biased into either its clamping or releasing position when the male member 1 is in the female member 2.

Juxtaposed said first part of each lever 18 is in the second part 24 which is in the form of a V-shaped projection which provides an abutment surface 25 for co-operating with the abutment surface 9 on the male member 1 and a cam surface 27 whose function will be described hereafter.

In order to assemble the coupling and make a joint between first and second pipes 28 and 29 (see FIG. 1), the first pipe 28 is inserted into the first portion 3 of the male member 1 until its free end abuts the step 6. A suitable adhesive will preferably have been applied to the pipe 28 and/or the male member 1 prior to insertion to ensure that the male member remains secured to the free end of the pipe when the adhesive dries. Similarly, the second pipe 29 and/or the end portion 14 of the female member 2 has adhesive applied to it and the second pipe 29 is inserted into the end portion 14 until it abuts the part thereof where the wall starts to taper towards the orifice 17. The method of retaining the pipe ends in the coupling just described is only preferred as other methods could be used for instance in the FIG. 1 embodiment. A compression clip can be fitted around the outside of the parts of the coupling which receive the pipe ends. Alternatively, the parts 3, 14 of the coupling can be inserted inside the hose or pipe and retained therein by means of an adhesive or other suitable means such as a compression clip.

If an adhesive is used, once it has set the respective male and female members 1 and 2 are securely attached to their respective pipes 28 and 29. The first pipe 28 with its male sleeve member 1 attached thereto is then offered up to the female clamping member 2 and insered into the clamping portion 13 thereof until it abuts the sealing ring 12 located in recess 16. The sealing ring illustrated is D-shaped in cross section but a circular or other cross section could be used. The levers 18 are then moved from their release position shown in FIG. 3 to their clamping position shown in FIG. 1 and during the initial part of said movement, the curved surface of the first part 23 of the lever 18 comes into contact with the male member, i.e. in the illustrated embodiment with the recess 7 in the male member 1 and moves the male member further into the female member 2 compressing the sealing ring 12 between end face 10 of the male member 1 to form a seal.

Once point x on the first part 23 comes into contact with the first member 1, further movement of the lever towards its clamping position takes place due to the over-centre action of the lever 18 which snaps it into its clamping position and keeps it there. In this position, the V-shaped projection or second part 24 drops into the V-shaped groove 8 in the first member 1 and grips it, contact being between the apex of each V-shaped projection 24 and its associated groove 8 in the male member. Thus, the projection 24 on each lever 18 produces a locking device against axial separation of the pipes in the coupling as well as the means for gripping the male member 1 when the levers 18 are in their clamping position, the first part 23 providing the means for drawing the male member 1 into the coupling to compress the sealing ring 12.

This cooperation between the V-shaped projection 24 and the recess 8 is advantageous in that axial loads of the coupling are supported by the projection 24 so any axial separation of the first and second pipes 28 and 29 retained in the coupling is prevented by the reaction between the abutment surface 25 one each lever 18 and the abutment surface 9 in the V-shaped groove 8 on the male member 1. Without this projection 24, axial separation of the pipes would be possible as movement of one pipe away from the other would cause the first part 23 of one or both levers 18 to roll along the recess 7 in the male member.

Furthermore, the projection 24 which cooperates with abutment surface 9 of the V-shaped groove 8 ensures that lateral deflection of the pipe 28 with respect to the longitudinal axis of the male member 1 will not permit axial separation of the male and female members with the resulting break down of the seal provided by the coupling. This is because any such movement of the pipe 28 causes the abutment surface 9 in the groove on the male member to be forced against the abutment surface 25 on the lever 18 to thereby tighten its grip thereon.

Depending on the size of the coupling and the axial loads it is likely to have to cope with, 3, 4 or even more levers 18 can be provided on the coupling. If 3 levers are used, they would be angularly spaced at 120° intervals from each other whereas with 4 levers the spacing would be at 90° degree intervals.

The coupling just described enables quick and easy release and connection of two pipes, tubes or hoses without damage to the coupling. Because the coupling is made of a plastics material, its condition does not deteriorate due to the prevailing weather conditions particularly when used in irrigation or fire extinguishing networks. Due to the design of the male member 1 and the levers 18, the coupling is able to provide and maintain a proper seal between the two pipes being connected irrespective of axial loads being applied to the pipes. Furthermore, the seal provided by the coupling can be maintained despite internal working pressures of for instance between 4 and 8 Kp/cm² as one-sided deformation of the coupling is avoided in the area of the clamping levers.

Although the coupling is primarily intended for connecting rigid plastics pipes, hoses or tubes, flexible pipes could also be connected by the coupling.

Whilst the coupling just described is intended for connecting pipes which are circular in cross section, its design could be readily altered to connect pipes of other tubular configurations such as square or rectangular for instance. Depending on the number of levers 18 provided on the female member 2, corresponding individual recesses 7 and grooves 8 could be provided on the male member although from a manufacturing point of view, it is found more convenient to use an annular groove and recess.

The coupling of the invention may also be used to connect pipes in a system such as a sewerage system which does not operate under pressure.

What I claim is:

1. A quick-action pipe or hose coupling comprising a male plastics sleeve member and a female plastics sleeve member said members having free ends for attachment to respective free ends of first and second pipes or hoses to be coupled together and said male sleeve member having an opposite end for engagement with an internal annular sealing surface on said female sleeve member, said female sleeve member being shaped to receive said male sleeve member and having pivotally attached thereto a pair of diametrically opposed levers which can swing between locking and unlocking positions, the exterior of said male sleeve member having an annular recess of arcuate cross-section and an annular V-shaped groove axially spaced from said recess and disposed between the latter and said opposite end of said male sleeve member, one wall of said groove providing a planar generally upright abutment surface which faces toward said recess, each of said levers including a first projection shaped to cooperate with said recess in said male sleeve member so that upon swinging movement of said levers toward their locking positions the sleeve members are urged toward each other, each of said levers including a V-shaped projection having a planar surface which engages said abutment surface when the lever is in its locking position to prevent axial separation of the sleeve members.

* * * * *